United States Patent [19]

Eakman et al.

[11] Patent Number: 5,726,560
[45] Date of Patent: Mar. 10, 1998

[54] SWITCHED RELUCTANCE GENERATOR

[75] Inventors: Kenneth J. Eakman, Oregon; Mike Andres; Lance Miller, both of Rockford, all of Ill.; Nicholas F. Campagna, Menomonee Falls, Wis.

[73] Assignee: Barber-Colman Company, Loves Park, Ill.

[21] Appl. No.: 522,612

[22] Filed: Sep. 1, 1995

[51] Int. Cl.⁶ .................................................. H02P 9/40
[52] U.S. Cl. .................. 322/89; 322/59; 310/90.5
[58] Field of Search ............... 322/94, 59; 310/49 R, 310/156, 113

[56] References Cited

U.S. PATENT DOCUMENTS

| | | |
|---|---|---|
| 2,103,356 | 12/1937 | Fisher . |
| 3,573,619 | 4/1971 | Ivec . |
| 3,591,844 | 7/1971 | Schonebeck et al. . |
| 3,787,100 | 1/1974 | Habermann et al. ............ 308/10 |
| 3,984,711 | 10/1976 | Kordik . |
| 4,091,687 | 5/1978 | Meinke et al. . |
| 4,315,171 | 2/1982 | Schaeffer . |
| 4,638,195 | 1/1987 | Lin . |
| 4,713,570 | 12/1987 | Mastromattei . |
| 4,748,362 | 5/1988 | Hedlund . |
| 4,883,999 | 11/1989 | Hendershot . |
| 4,990,809 | 2/1991 | Artus et al. . |
| 4,995,159 | 2/1991 | Hancock et al. . |
| 5,015,903 | 5/1991 | Hancock et al. . |
| 5,039,932 | 8/1991 | Belanger et al. . |
| 5,053,662 | 10/1991 | Richer ................................ 310/90.5 |
| 5,111,095 | 5/1992 | Hendershot . |
| 5,204,604 | 4/1993 | Radun . |
| 5,225,712 | 7/1993 | Erdman . |
| 5,289,107 | 2/1994 | Radun et al. . |
| 5,381,081 | 1/1995 | Radun . |
| 5,404,091 | 4/1995 | Radun . |
| 5,424,595 | 6/1995 | Preston et al. ..................... 310/90.5 |
| 5,525,848 | 6/1996 | Pinkerton et al. .................. 310/90 |
| 5,545,964 | 8/1996 | Stephenson et al. .............. 318/701 |
| 5,574,345 | 11/1996 | Yoneta et al. ...................... 318/376 |
| 5,578,880 | 11/1996 | Lyons et al. ....................... 310/90.5 |

FOREIGN PATENT DOCUMENTS 0 340 029 B1  7/1994  European Pat. Off. .

OTHER PUBLICATIONS

Arumugam, et al., *A Comparison of the Performance of Two Different Types of Switched Reluctance Motors*, Electric Machines and Power Systems, 12:281–286 (1987).

Primary Examiner—Steven L. Stephan
Assistant Examiner—Nicholas Ponomarenko
Attorney, Agent, or Firm—Fish & Richardson P.C.

[57] ABSTRACT

A switched reluctance generator that can be used in an air cycle machine, where the generator uses the energy from the shaft of the air cycle machine to provide a back-up power supply to the magnetic bearings supporting the shaft. The generator includes circuitry for comparing the non-commutated excitation current with a command signal to regulate the excitation current, thereby regulating the generator output voltage.

17 Claims, 6 Drawing Sheets

SWITCHED RELUCTANCE GENERATOR

BACKGROUND OF THE INVENTION

The present invention relates to switched reluctance generators.

Reliable primary and backup power supplies are required for many critical applications. For example, aircraft have numerous power requirements separate from the aircraft-propelling engines. Avionics and environmental control systems are critical to the proper functioning of the aircraft.

For example, air cycle machines are used as a source of cooling air for the avionics and cabin environment. A bootstrap-type air cycle machine has a primary shaft that includes both a compressor rotor and a turbine rotor. In one design, the primary shaft of the air cycle machine is supported by magnetic bearings. The magnetic bearings are yet another device on the aircraft that requires a power supply.

Another set of issues when designing aircraft systems, as well as other systems, are the packaging requirements, primarily the size and weight of the devices. In an aircraft, these issues are particularly critical. Therefore, there is a need for power supplies that use existing sources of energy within the aircraft and do not significantly increase size, cost, or weight.

Additionally, many older aircraft have unreliable or inadequate sources of electrical power. Therefore, these older aircraft need a power supply to supplement the existing systems or at least minimize the impact of new power demands.

SUMMARY OF THE INVENTION

The switched reluctance generator of the present invention includes a rotor having a series of spaced rotor poles. The inter-pole gaps are curved to accept spacers to reduce aerodynamic losses. The generator also includes a stator having a series of U-shaped stator pole assemblies.

Each stator pole assembly includes a pair of stator poles and a yoke. Excitation coils are wound about the stator poles, and output coils are wound about the yoke. The generator has three phases with each phase having a pair of opposed stator pole assemblies.

The output coils induce a voltage that is fed into a full-wave, bridge rectifier, yielding a generally DC signal. The generally DC output voltage is controlled by a regulation circuit associated with the rotor/stator assembly. The regulation circuit includes a voltage differential circuit for measuring the difference between the output voltage and a predetermined reference or threshold value. The output of the voltage differential circuit is a command signal.

An amplifier circuit is used to compare the command signal with the excitation current. The output signal from the amplifier circuit is used as the input of a driver circuit. The driver circuit controls the voltage applied to the excitation coils.

If the generator output voltage is lower than the reference voltage, the regulation circuit causes a voltage to be applied to the excitation coils, increasing the generator output voltage until it reaches the reference voltage.

The generator has many applications, including air cycle machines. The rotor may be disposed on the shaft of the air cycle machine with the stator spaced circumferentially about the rotor. If the air cycle machine has magnetic bearings, the generator can provide back-up power to the bearings. Additionally, the generator can provide power to other systems.

2

Advantages of the present invention include the following. A relatively low-cost, reliable generator is provided using an existing energy source to provide a regulated output. The generator of the present invention does not require a commutated excitation signal, providing cost, size, and weight efficiency, and simplified electronics.

Also, a generator is provided in an air cycle machine that uses the rotational energy of the air cycle machine shaft to provide the power for the magnetic bearings that support the shaft. The non-rectified AC output signal of the generator may be used to accurately determine air cycle machine shaft rotation speed. The generator may also be used to brake the shaft by imposing additional drag, thereby reducing the coast down time in instances when the electrical power and pressurized air source are both lost, minimizing damage or wear to the machines backup bearings.

Additionally, the apparatus may be used as a motor to control the shaft rotation. Other features and advantages will become apparent from the following description and claims.

DESCRIPTION OF THE PREFERRED EMBODIMENTS

Figure 1:
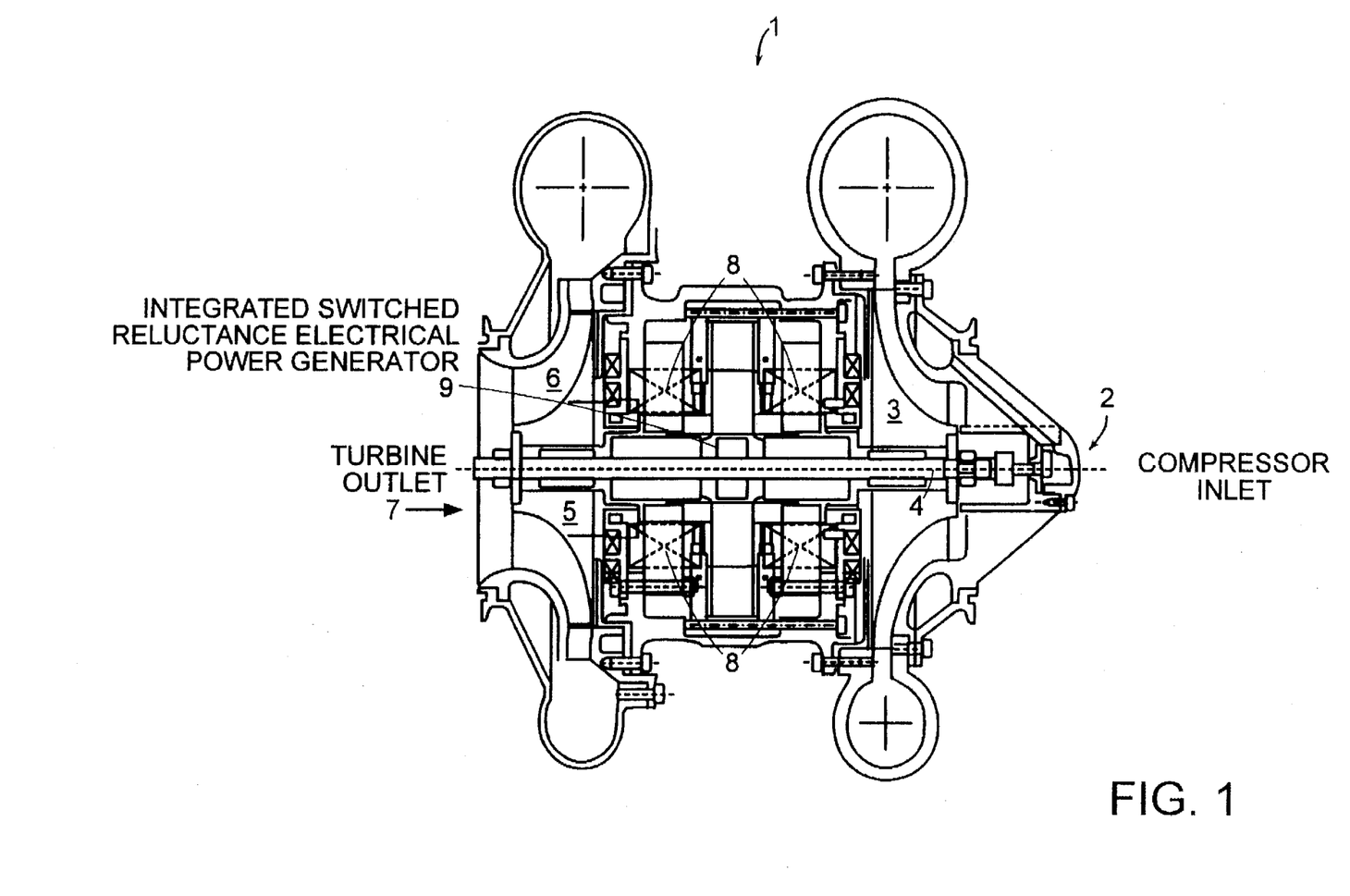
FIG. 1. is a cross-sectional view of an air cycle machine.

For purposes of illustration, one embodiment of the invention is shown in FIG. 1. An air cycle machine 1 is used in an aircraft propelled by at least one engine. Air discharged from the engine is directed to compressor inlet 2. Compressor rotor 3 is supported by shaft 4, which is rotably supported within the air cycle machine housing. Shaft 4 also supports turbine rotor 5. The air fed through inlet 2 is compressed, cooled, then fed into turbine 6, including turbine rotor 5. The compressed air fed into turbine 6 expands, causing turbine rotor 5 to drive shaft 4 and providing cool air via outlet 7 for use in cooling the aircraft cabin and avionics. Shaft 4 is supported within the housing by magnetic bearings 8. A more detailed disclosure of an air cycle machine is found in U.S. Pat. No. 5,310,311, assigned to Barber-Colman Company, Rockford, Ill., and incorporated herein by reference.

A power supply within the aircraft provides 28 volts DC to energize magnetic bearings 8. If the power supply fails and no back-up system is provided, the magnetic bearings 8 will no longer support the air cycle machine shaft 4. Back-up bearings may support the shaft for a very short period of time (e.g., about ten seconds). Therefore, a back-up power supply for the bearings 8 is needed.

In the present invention, a switched reluctance generator 9 is incorporated into air cycle machine 1. The rotational energy of shaft 4 is converted into electrical energy via generator 9, adding a minimum of weight to air cycle machine 1 and the aircraft as a whole. Also, as long as shaft 4 is rotating above a minimum speed, magnetic bearings 8 have a power supply. In other embodiments, the output of generator 9 can be used for supplementing aircraft power to back-up other systems. Also, generator 9 may be used in other applications where reluctance generators are advantageous and is not limited to the type of air cycle machine described herein or air cycle machines in general.

Figure 2:
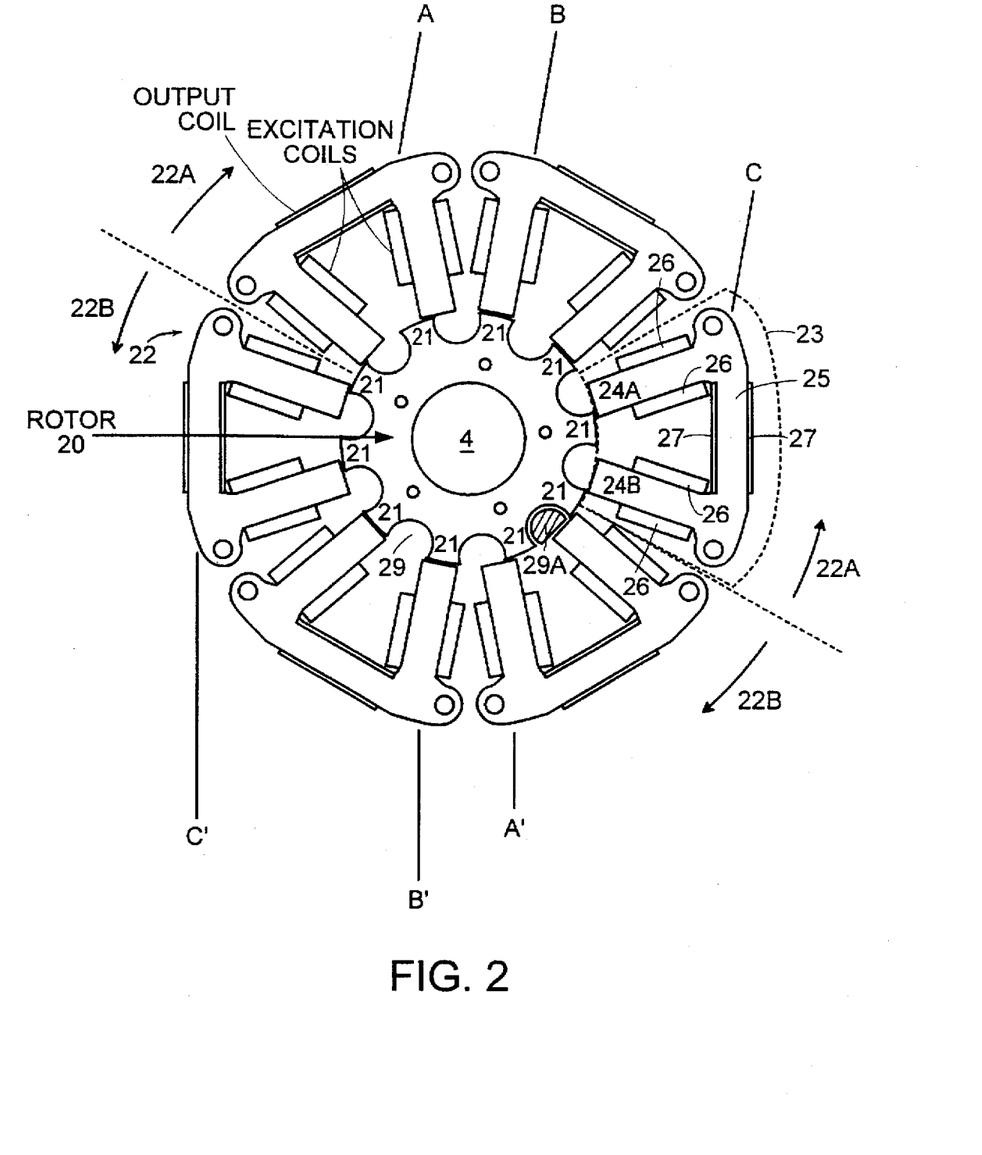
FIG. 2. is a cross-sectional view of the electro-mechanical portion of the switched reluctance generator of the present invention.

A cross-sectional view of the electro-mechanical portion of generator 9 is shown in FIG. 2. Rotor 20 is positioned on shaft 4. Rotor 20 includes ten evenly-spaced rotor poles 21. The inter-pole gaps or notches 29 of rotor 20 that define the space between rotor poles 21 are generally rounded. The rounded configuration provides relatively easy insertion of non-magnetic, non-conductive spacers 29A in cutouts 29, reducing the aerodynamic losses otherwise caused by gaps 29 during the rotation of rotor 20.

Stator 22 is positioned in the air cycle machine housing circumferentially about rotor 20. Stator 22 includes six stator pole assemblies 23. Each stator pole assembly 23 comprises a U-shaped structure defining stator pole pairs 24A, 24B connected by yoke 25. Wound about each stator pole is an excitation coil 26. All of the excitation coils 26 are connected in series. In other embodiments, the excitation coils 26 can be connected in parallel or series/parallel connections. Wound about each yoke 25 is an output coil 27. Each stator pole assembly 23 is magnetically isolated from all other stator pole assemblies in stator assembly 22.

The six stator pole assemblies 23 define a three-phase generator, with each phase having a pair of opposed stator pole assemblies (A and A', B and B', and C and C'). This configuration is particularly well-suited for magnetic bearing applications because any radial magnetic force from a stator assembly 23 on rotor 20 (and consequently on shaft 4) is approximately offset by the magnetic force of an opposed stator assembly. For example, if stator pole assembly A exerts a radial magnetic force on rotor 20, this force is approximately offset due to the magnetic force from associated stator pole assembly A'.

Additionally, stator 22 may also have a split assembly consisting of two, half sections 22A and 22B. The two sections are selectively coupled by known fastening techniques. The split assembly provides relatively easy access to the stator pole assemblies 23, rotor 20, and shaft 4, for repair and maintenance. Also, the split assembly is easily incorporated into the air cycle machine disclosed in U.S. Pat. No. 5,310,311, also having a clam shell housing.

Other configurations of the electro-mechanical portion of generator 9 may also be used. For example, the number of rotor poles, stator pole assemblies, and stator poles may vary. The precise distance between rotor poles, between stator poles, and between rotor and stator poles may vary. The configuration of the stator yokes and winding configurations may also vary.

Figure 3:
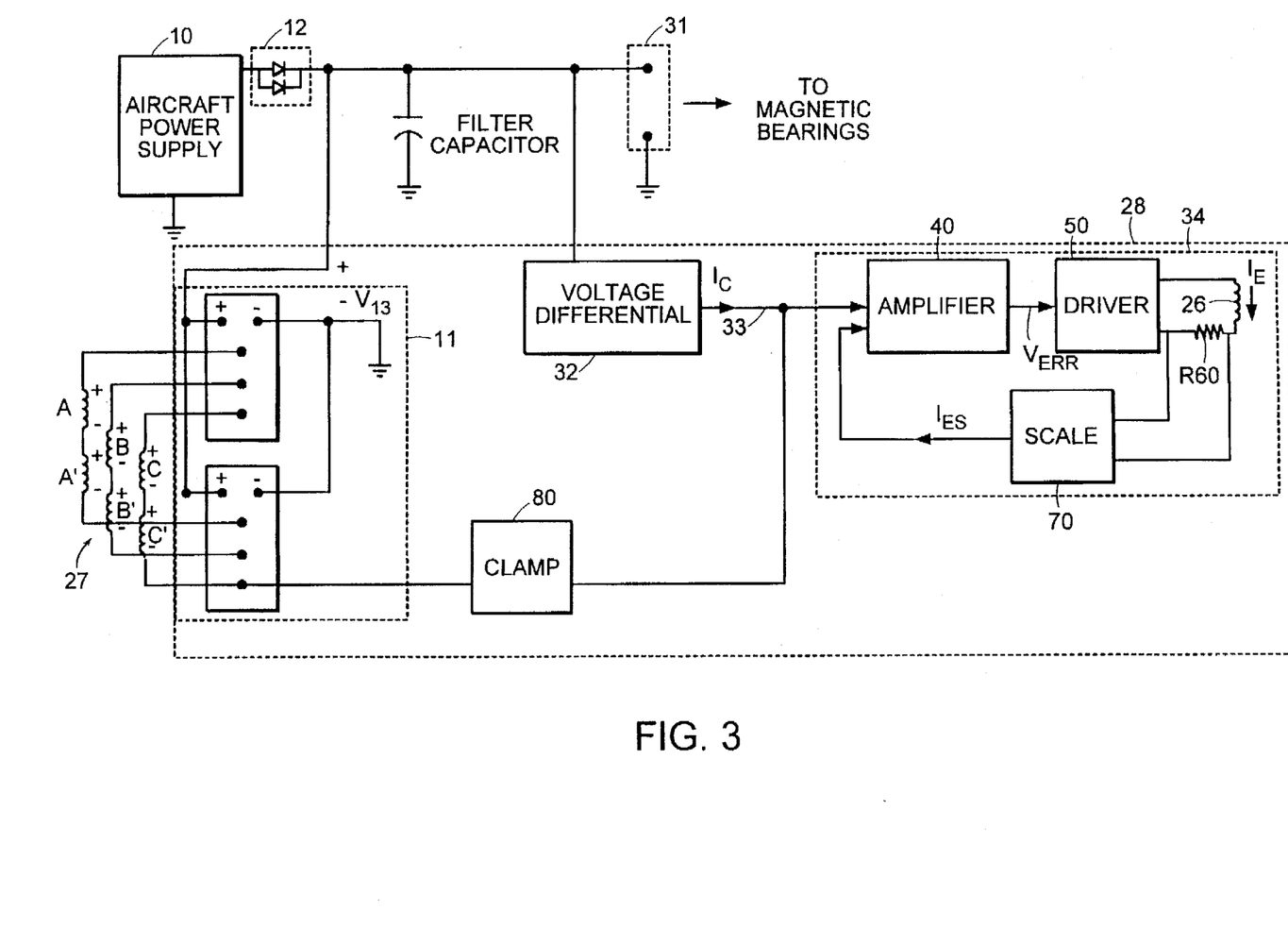
FIG. 3. is a block diagram of the electronic portion of the present invention.

The rotation of shaft 4, and consequently rotor 20, is converted into electrical energy by generator 9. Generally, as rotor 20 moves, the magnetic flux through each stator pole 24A, 24B is varied due to the changing pole area between the rotor and stator poles. This change in flux is coupled through the output coils 27 into a generator output voltage. As shown in FIG. 3, each of the six output coil voltages are full-wave rectified and filtered to provide a back-up DC power supply for magnetic bearings 8 or other device.

The voltage supplied to the magnetic bearings 8 (shown as output 31), including the full-wave rectified voltage from generator 9, is compared to a desired bearing supply voltage (e.g., 28 volts) by a voltage regulation circuit 28. The excitation current induced by the excitation coils 26 is driven with a circuit that measures and controls the excitation current level to match a command level generated by the voltage regulation circuit 28. The command level is adjusted to maintain the desired bearing supply voltage independent of rotor speed, load, and temperature (within limits).

As shown in FIG. 3, aircraft power supply 10 provides energy to magnetic bearings 8 at output 31. The output voltage of output coils 27 is fed into a full-wave bridge rectifier circuit 11. The output voltage $V_{13}$ of rectifier 11 is in parallel with power supply 10. Therefore, the total voltage at output 31 is the larger of the voltage from aircraft power supply 10 or the rectified generator voltage $V_{13}$. Diodes 12 prevent generator voltage $V_{13}$ from reflecting back into power supply 10.

Voltage differential circuit 32 is a proportional derivative control circuit that detects the voltage at output 31 and generates a command current or signal 33 ($I_c$) proportional to the difference between the detected voltage at output 31 and 28 volts DC. If voltage regulator 32 detects 28 volts, then it generates a command current 33 of zero amps. If voltage regulator 32 detects a voltage at output 31 lower than 28 volts, it generates a command current 33 calibrated to increase the excitation current in the excitation coils 26, thereby increasing the output voltage of generator 9 to about 28 volts.

Figure 4:
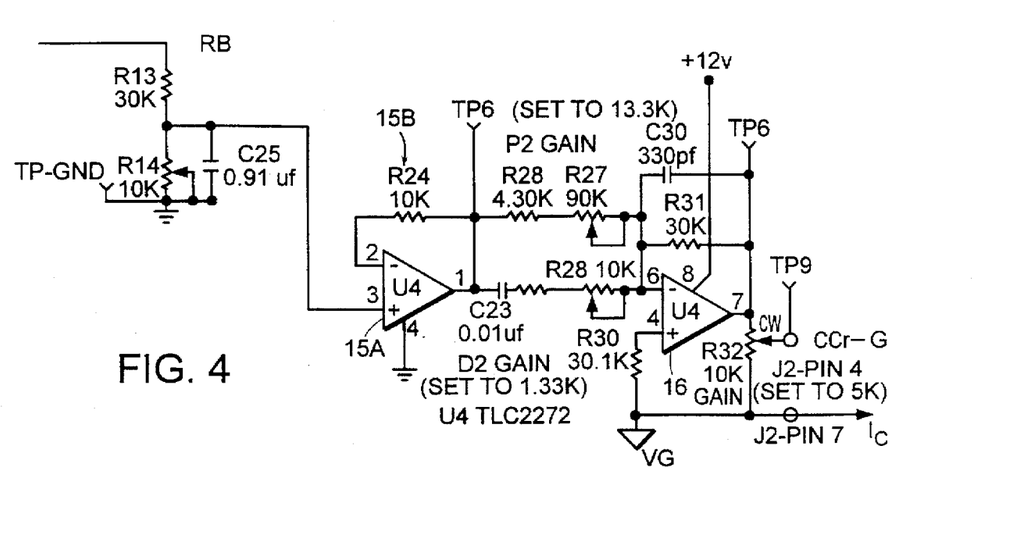
FIG. 4. is a diagram of the voltage differential circuit.

One embodiment of voltage regulator 32 is shown in FIG. 4. The voltage at output 31 is measured and scaled by resistors R13 and R14. Operational amplifier 15A and associated resistor 15B buffer the scaled signal. Operational amplifier 16 and associated passive components function to generate output or command signal 33.

Command signal 33 increases as the voltage at output 31 decreases below about 28 volts and as the rate of decrease in the voltage at output 31 increases. Command current 33 is then used in excitation current control 34.

Excitation current control includes amplifier circuit 40, driver 50, and filter/scale circuit 70. Command current 33 is an input to amplifier circuit 40 (subject to clamping circuit 80 discussed below). The second input to amplifier circuit 40 is a scaled value ($I_{ES}$) of the excitation current, $I_E$, detected in excitation coils 26.

Figure 5:
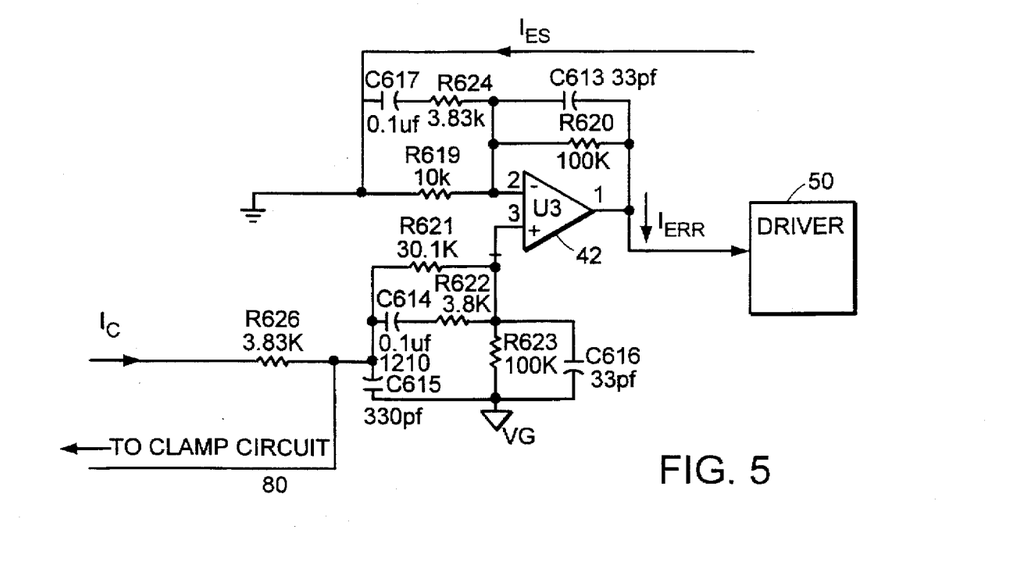
FIG. 5. is a diagram of the amplifier circuit.

A more detailed drawing of amplifier circuit 40 is provided in FIG. 5. Command signal $I_c$ and scaled excitation current $I_{ES}$ are the inputs to operational amplifier 42. The output signal, $I_{ERR}$, of operational amplifier 42 represents the increase required for the excitation current to increase the voltage at output coils 27 to about 28 volts DC.

Figure 6:
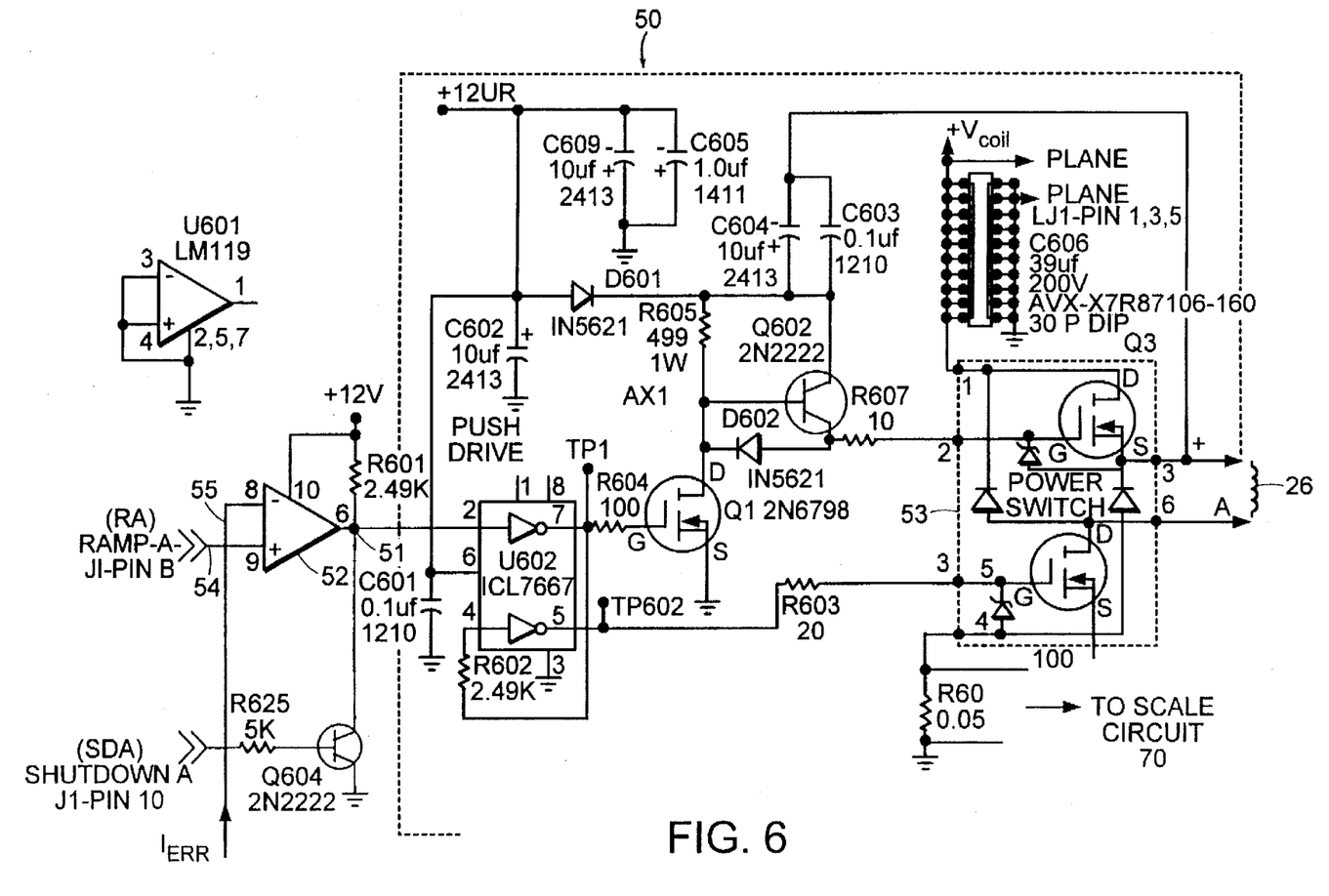
FIG. 6. is a diagram of the driver circuit.

$I_{ERR}$, the output of amplifier circuit 40, is used as an input to driver 50. A more detailed drawing of driver circuit 50 is shown in FIG. 6. (Also, a suitable driver circuit is disclosed in U.S. application Ser. No. 08/331,306, incorporated herein by reference.) Driver circuit 50 functions as a pulse-width modulated switching amplifier.

Driver circuit 50 switches the voltage to the excitation coils 26 on and off in response to the output signal 51 of comparator 52. If the signal at output 51 is high, power transistors 53 switch on the voltage to excitation coils 26. If the signal at output 51 is low, transistors 53 switch off the voltage to the excitation coils 26.

Pulse-width modulation is provided by comparator 52. The input at pin 54 of comparator 51 is a sawtooth waveform, and the input at pin 55 is $I_{ERR}$ from comparator circuit 40. As $I_{ERR}$ increases, the output of comparator 51 stays high longer. Consequently, the duty cycle of transistors 53 increases and the average voltage supplied to the excitation coils 26 increases.

Figures 7, 8:
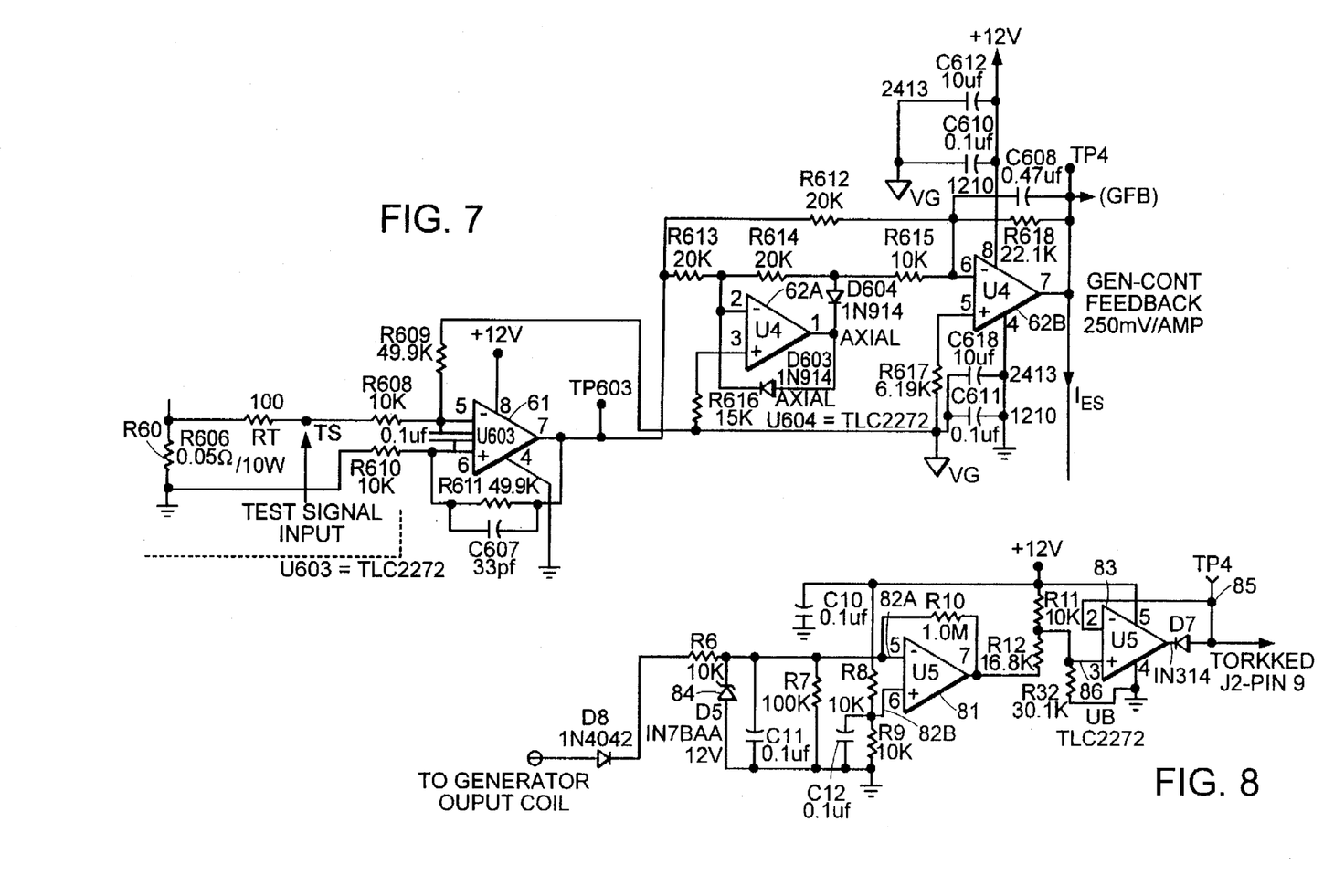
FIG. 7. is a diagram of the scaling circuit.
FIG. 8. is a diagram of the clamping circuit.

As described above, the excitation current is processed before being used as one of the inputs to amplifier circuit 40. As shown in FIG. 7, the excitation current $I_E$ in excitation coils 26 is measured at resistor R60. The excitation current is then filtered and scaled in circuit 70. Amplifier 61, and associated resistors, amplifies the signal by a factor of five. The remaining circuitry, including operational amplifiers 62A, 62B, and associated passive components, generate an absolute value of $I_{ES}$, and then filters the signal.

Therefore, the present invention includes a switched reluctance generator, operated with a non-commutated excitation current, for providing a regulated power supply. The unique design provides minimal size, weight, and cost constraints, and can be easily incorporated into an air cycle machine.

Additionally, the present invention may include clamping circuit 80. Clamping circuit 80 has the effect of limiting the excitation current in the excitation coils 26 during start-up of the air cycle machine to prevent the generator 9 from excessively braking or holding shaft 4 and preventing start-up. Also, clamping circuit 80 serves to provide an upper limit on the command signal input to amplifier circuit 40, even when voltage differential circuit 32 would otherwise generate a higher command signal input. Finally, clamping circuit 80 prevents unnecessary power dissipation when the generator is stopped.

A more detailed drawing of the clamping circuit 80 is shown in FIG. 8. The input to clamping circuit 80 is the output from output coils 27. Operational amplifier 81 compares the voltages at pins 82A and 82B. When the output coil voltage is relatively low (e.g., about 6 volts peak-to-peak), the voltage at pin 82B exceeds the voltage at pin 82A and the output of amplifier 81 is low.

The output of amplifier 81 then sets the threshold voltage for a clamping circuit, comprising amplifier 83 and diode 84. The command signal 33 is then limited to 1 amp, limiting the torque created by generator 9 on shaft 4 and allowing shaft 4 to rotate during start-up or other low-rotation situations. Without clamping circuit 80, at start-up of the air cycle machine the voltage regulation circuit 28 would detect a very low voltage at output 31 and generate a large command signal to drive up the excitation current. This situation would then cause generator 9 to exert a relatively large torque on shaft 4, possibly preventing the rotation of shaft 4.

When the output coil voltage increases, causing the voltage at pin 82A to exceed the voltage of pin 82B, then the output of amplifier 81 goes high. Amplifier 83 and diode 84 clamp are now set to a higher threshold of about 12 amps. When the voltage at pin 85 is less than the voltage at pin 86 of amplifier 83, the clamp circuit is inactive. When the voltage at pin 85 exceeds the voltage at pin 86, then the output of amplifier 83 draws current through diode 84, preventing the voltage at pin 85 from exceeding the voltage at pin 86. Therefore, signal $I_c$ is limited to a maximum value of 12 amps and driver 50 is prevented from generating a higher duty cycle even when the command signal would otherwise call for it.

Other embodiments are within the scope of the following claims.

What is claim is:

1. A magnetic bearing system and turbine with a dual power supply, comprising:

a shaft, rotatable about a central axis;

a turbine mounted on the shaft having an inlet means for receiving pressurized gas, said turbine and shaft being driven into rotation by the gas;

a magnetic bearing for supporting the shaft;

a source of electrical current connected to energize the bearing in normal operation; and a generator for supplying electrical current to the magnetic bearing as an alternative power supply to the source of electrical current, the generator comprising a rotor disposed on the same shaft and a stator disposed circumferentially about the rotor.

2. The system of claim 1, the stator comprising a plurality of stator pole pairs, each stator pole pair comprising an excitation coil and output coil, and the rotor comprising a plurality of rotor poles.

3. The system of claim 2, wherein the excitation coils are connected in series, the output coils are connected to a bridge rectifier, and an output of the bridge rectifier includes a generally DC voltage.

4. The system of claim 3, wherein said source of electrical current is connected in parallel with the output voltage of the bridge rectifier.

5. The system of claim 3, further comprising means for regulating the output voltage of the bridge rectifier.

6. The system of claim 5, wherein the means for regulating comprises means for determining a difference between the rectifier output voltage and a predetermined value, and for generating a command signal proportional to the difference.

7. The system of claim 6, wherein the means for regulating further comprises means for sensing a current in the excitation coils.

8. The system of claim 7, wherein the means for regulating further comprises means for determining a difference between the command signal and the excitation current.

9. The air cycle machine of claim 8, wherein the means for regulating further comprises means, operably connected to the means for determining the difference between the command signal and excitation current, for adjusting the excitation current.

10. The air cycle machine of claim 9, further comprising means for limiting the command signal to a predetermined range.

11. The system of claim 1, further comprising the elements of an air cycle machine including:

a compressor mounted on the shaft and having an inlet means for receiving pressurized gas to be compressed, a turbine mounted on the shaft and having an inlet means for receiving gas pressurized by the compressor, said turbine being driven by the gas pressurized by the compressor and acting though the shaft to drive the compressor, the pressurized gas received by said turbine expanding therein, being cooled as a result of expanding and being exhausted as chilled gas by said turbine.

12. The system of claim 11, wherein the rotor includes circumferential pole pieces with spaces therebetween, and further comprising non-magnetic non-conductive material occupying the spaces sufficiently to improve the aerodynamic properties of the rotor such that in operation aerodynamic energy losses otherwise caused by the spaces are reduced.

13. The system of claim 12, further comprising control circuitry for connecting the source of electrical current and electrical output of the generator in parallel to produce a combined output to the magnetic bearing and applying a control signal to the generator to increase the electrical output of the generator whenever the combined output falls below a predetermined minimum level.

14. The system of claim 13 wherein the generator is a switched reluctance generator having excitation coils and the control signal is applied by said control circuitry as an excitation signal to the excitation coils.

15. The system of claim 14 in which the excitation current applied by said control circuitry imposes rotational drag in response to a reduction in air flow.

16. The system of claim 15 in which controlling the excitation current imposes rotational drag in response to a reduction in the electrical current from the source.

17. The system of claim 1, wherein said generator is a switched reluctance generator.

* * * * *